(12) United States Patent
Schuster et al.

(10) Patent No.: US 11,958,343 B2
(45) Date of Patent: Apr. 16, 2024

(54) ROOF ARRANGEMENT FOR A VEHICLE ROOF, AND VEHICLE ROOF, WITH A ROOF OPENING

(71) Applicant: Webasto SE, Stockdorf (DE)

(72) Inventors: Samuel Schuster, Stockdorf (DE); Stefan Schäufler, Stockdorf (DE); Andreas Josef Zunzer, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 39 days.

(21) Appl. No.: 17/740,523

(22) Filed: May 10, 2022

(65) Prior Publication Data
US 2022/0371416 A1 Nov. 24, 2022

(30) Foreign Application Priority Data

Jun. 29, 2021 (DE) .......................... 102021116745.0

(51) Int. Cl.
| | |
|---|---|
| *B60J 10/16* | (2016.01) |
| *B60J 7/02* | (2006.01) |
| *B60J 7/043* | (2006.01) |
| *B60J 10/24* | (2016.01) |
| *B60J 10/246* | (2016.01) |
| *B60J 10/33* | (2016.01) |
| *B60J 10/80* | (2016.01) |
| *B60J 10/82* | (2016.01) |

(52) U.S. Cl.
CPC ................ *B60J 10/82* (2016.02); *B60J 7/022* (2013.01); *B60J 7/043* (2013.01); *B60J 10/16* (2016.02); *B60J 10/24* (2016.02); *B60J 10/246* (2016.02); *B60J 10/33* (2016.02); *B60J 10/80* (2016.02)

(58) Field of Classification Search
CPC ... B60J 10/00; B60J 10/15; B60J 10/16; B60J 10/21; B60J 10/24; B60J 10/246; B60J 10/33; B60J 10/80; B60J 10/82; B60J 10/84; B60J 10/85; B60J 7/022; B60J 7/04; B60J 7/043; E06B 7/2305; E06B 7/2309
USPC ...... 296/216.06, 216.07, 216.08, 216.09, 93; 49/479.1, 489.1, 490.1, 498.1; 277/534, 277/922
See application file for complete search history.

(56) References Cited

U.S. PATENT DOCUMENTS

| | | | |
|---|---|---|---|
| 9,950,599 B2* | 4/2018 | Zunzer | ..................... B60J 7/022 |
| 2005/0022454 A1* | 2/2005 | Aida | ........................ B60J 10/27 |
| | | | 49/499.1 |

(Continued)

FOREIGN PATENT DOCUMENTS

| | | |
|---|---|---|
| DE | 102017118397 B3 | 11/2018 |
| DE | 102017116940 A1 | 1/2019 |

*Primary Examiner* — Amy R Weisberg
*Assistant Examiner* — Joyce Eileen Hill
(74) *Attorney, Agent, or Firm* — Fitch, Even, Tabin & Flannery, LLP (57) ABSTRACT

Vehicle roof arrangement with a movable roof element held by a frame for selectively closing a roof opening. The roof element may have a first strand-like seal profile and a second strand-like seal profile, which is formed separately from the first seal profile. The first seal profile is configured for sealing with respect to the movable roof element and can be fastened to the vehicle roof, and the second seal profile can be fastened to the frame by a plug connection and is configured for sealing between the frame and the vehicle roof. The plug connection may have a plug-in region of the frame, into which plug-in region a projection of the second seal profile may be plugged.

10 Claims, 5 Drawing Sheets

(56) References Cited

U.S. PATENT DOCUMENTS

| | | | |
|---|---|---|---|
| 2009/0115227 A1* | 5/2009 | Radmanic | B60J 10/248 |
| | | | 296/213 |
| 2019/0275871 A1* | 9/2019 | Schäufler | B60J 10/248 |
| 2020/0156452 A1 | 5/2020 | Frank et al. | |

* cited by examiner

ROOF ARRANGEMENT FOR A VEHICLE ROOF, AND VEHICLE ROOF, WITH A ROOF OPENING

CROSS-REFERENCE TO RELATED APPLICATION

This application claims priority from German Patent Application Number DE 102021113141.3, filed May 20, 2021, and German Patent Application Number DE 102021116745.0, filed Jun. 29, 2021, which are hereby incorporated herein by reference in their entirety for all purposes.

FIELD

A roof arrangement for a vehicle roof with a roof opening, in particular for a vehicle roof having a movable roof element, is specified. Furthermore, a vehicle roof having such a roof arrangement is specified.

BACKGROUND

A vehicle roof of a motor vehicle may have a roof opening which is closed off, and selectively opened up at least partially, by a movable roof element. For the purpose of sealing off the vehicle roof with the movable roof element, provision is made for example of a seal. Said seal is intended to avoid passing of penetrating water into a dry region of the vehicle roof and/or of the motor vehicle. A seal for a vehicle roof is described for example in DE 10 2017 116 940 A1.

It is desirable to specify a roof arrangement which makes possible reliable sealing. It is moreover desirable to specify a vehicle roof having such a roof arrangement that can be reliably sealed off.

SUMMARY

According to one embodiment, a roof arrangement for a vehicle roof has a movable roof element. The vehicle roof has a roof opening. The movable roof opening is configured to selectively close off or at least partially open up the roof opening. The roof element is held by a frame of the roof arrangement. The roof arrangement has a first strand-like seal profile and a second strand-like seal profile. The second strand-like seal profile is formed separately from the first seal profile.

In particular, before being mounted, the first seal profile and the second seal profile are movable relative to one another and in particular produced apart from one another. For example, the first seal profile and the second seal profile comprise different materials. It is also possible for the same material to be used for the first seal profile and the second seal profile, wherein use is made of different production tools for the two seal profiles. In particular, the first seal profile and the second seal profile are in each case separate components which are mountable independently of one another.

The first seal profile is configured for sealing with respect to the movable roof element and can be fastened to the vehicle roof. The second seal profile is fastened to the frame and is configured for sealing with respect to the vehicle roof or with respect to the vehicle bodyshell.

The roof opening with the two separate seal profiles makes it possible for different sealing functions to be realized by the separate seal profiles. In particular, the first seal profile is provided for sealing between the vehicle roof and the movable roof element and, in the operationally ready state, is fastened to the vehicle roof. The second seal profile is provided for sealing between the frame and the vehicle roof and, in the operationally ready state, is fixed to the frame. Consequently, in each case the two seal profiles are or are able to be fixed to the component with respect to which they are also intended to provide sealing action.

In the operationally ready state, the first seal profile is fastened to the vehicle roof and, when the roof element is closed, seals off the transition between the roof element and the vehicle roof. Water which nevertheless passes to the inside between the first seal profile and the roof element is conducted into a water-guiding channel of the frame. In order for penetrating water to be conducted as fully as possible into said water-guiding channel and to be able to be removed in a controlled manner and not to pass into a dry region, the second seal profile is provided. The second seal profile seals off with respect to the frame in such a manner that water cannot pass along the frame into the interior of the motor vehicle into a dry region. In particular, passing of penetrating water into the dry region via the second seal profile is prevented.

The embodiment as two separate seal profiles makes it possible for the sealing with respect to the frame to be reliably realized. In order for the second seal profile to be fastened reliably to the frame, a plug connection is provided. The second seal profile is fastened to the frame by means of the plug connection. The plug connection has a plug-in region of the frame. A projection of the second seal profile is plugged into the plug-in region.

The mounting and fixing by means of the plug connection makes possible simple and reliable mounting, which in particular may also be carried out by a single person. The plug connection and, in particular, the plug-in region reliably predefine the position of the second seal profile relative to the frame, so that, for example, no mounting gauge is necessary. By contrast to an adhesive connection of the second seal profile, there is no need for preparation time at the frame since, for example, no base coats or the like have to be applied. Also, in other respects, no particular preparations or requirements for the formation of the plug connection are necessary, for example no cleaning or the like is required. Detachment of the second seal profile from the frame after the mounting can be substantially avoided.

According to one embodiment, the plug-in region has two mutually oppositely situated side walls. The projection is plugged in between the two side walls. The two side walls delimit an interior space of the plug-in region. For example, the projection is clamped between the two side walls, so that a force and/or form-fitting connection is produced. The projection can be pushed in between the two side walls, so that, in the operationally ready state, the projection is arranged in the plug-in region between the two side walls. The projection of the second seal profile is thus held by the plug-in region on both sides.

According to one embodiment, the plug-in region, at least sectionally, has an inclination in relation to a vertical direction, so that the plug-in region is of inclined form. The plug-in region, sectionally, extends not along the vertical but inclined thereto. For example, the plug-in region extends vertically or at an inclination between the vertical and the horizontal. The inclination of the plug-in region is in particular not equal at all points of the frame, but is different at different positions of the frame.

For example, the plug-in region is formed so as to be inclined to a greater extent on a longitudinal side of the frame, which extends along an opening direction of the roof element, than on a transverse side of the frame, which extends transversely to the opening direction. The angled or inclined plug-in region makes possible reliable mounting with a relatively low structural space requirement. The installation direction is thus flexibly predefinable and is in particular differently predefinable at different positions of the frame. For example, a rotation from an angled, inclined position in the range of the horizontal orientation to a vertical orientation is possible.

According to one embodiment, an interruption of the plug-in region is provided in a transition region between the longitudinal side and the transverse side. Said transition region allows for example simple mounting and reliable operation even with different orientations of the plug-in region along the longitudinal side and along the transverse side. For example, the plug-in region is of inclined form along the longitudinal side and is oriented along the vertical along the transverse side. The transition region makes it possible for the second seal profile to be mountable continuously both on the longitudinal side and on the transverse side.

According to one embodiment, the second seal profile has a further projection. By way of the further projection, the plug connection can be formed. For example, the second seal profile thus has two projections. The plug projection is formed either by way of the first projection or by way of the second projection. Consequently, mounting with different projections, according to location, is possible. In this way, for example, rotation of the projection between differently inclined regions of the plug-in region is avoidable. For example, along the longitudinal side, the seal profile is plugged by way of the projection into a plug-in region which is oriented substantially along the vertical. Along the transverse direction, the second seal profile is, for example, fastened by way of the further projection into a substantially vertically oriented plug-in region. Consequently, even very differently oriented inclinations of the plug-in region can be realized.

According to one embodiment, the second seal profile has a sealing lip. The sealing lip abuts against the frame. The sealing lip is of longitudinally projecting form in order to form with the frame a common contact surface at which the sealing lip abuts against the frame. The contact surface is formed in particular along the entire length of the sealing lip, so that as far as possible no gap through which water could enter the dry region is formed between the drip lip and the frame. The plug connection for fixing of the second seal profile makes possible reliable formation of the contact surface between the frame and the sealing lip. Undulation of the sealing lip can be avoided even for the mounting around the curve between longitudinal side and transverse side.

According to one embodiment, a notch is provided on the sealing lip in order to locally weaken the sealing lip.

According to one embodiment, the sealing lip has as an alternative or in addition to the notch a sub-region composed of a material which is softer than another material of the sealing lip outside the sub-region. For example, the material of the sub-region is cellular rubber or comprises cellular rubber. The material of the sub-region is in particular more flexible than the material of the rest of the sealing lip. For example, the notch is formed in the sub-region. For example, the notch is formed outside the sub-region. For example, the notch is formed on a side of the sealing lip that faces towards the frame. Alternatively or additionally, the notch is formed for example on a side of the sealing lip that faces away from the frame.

By means of the notch and/or the softer material in the sub-region, the preloading of the sealing lip is locally reducible. Consequently, undesired bending of the sealing lip upwards in the direction of the first strand-like seal profile is avoidable or can at least be reduced. The sub-region, with its relatively high degree of flexibility, makes it possible for the sealing lip to be angled sufficiently relative to the rest of the second seal profile. Consequently, the contact surface between the frame and the sealing lip can be reliably realized. Outside the sub-region, the sealing lip can be formed with a hard material such that the desired preloading and sealing action is able to be realized.

Through the arrangement of the harder and softer regions, the deformation geometry of the sealing profile can be influenced regionally in order for the sealing function and further requirements, such as for example a spacing to a neighbouring component or a resulting angular position of the sealing lip, to be realized in variable manner and as reliably as possible.

According to one embodiment, the first seal profile can be fastened to the vehicle roof by means of an adhesive connection. Consequently, the first seal profile and the second seal profile have different types of connections for fastening. The first seal profile can be fastened by means of the adhesive connection. The second seal profile can be fastened by means of the plug connection.

According to one embodiment, the second seal profile has a second sealing lip for sealing with respect to the vehicle roof. In the operationally ready state, the second sealing lip abuts against the vehicle roof such that reliable sealing between the frame and the vehicle roof is realized by means of the second seal profile. The second sealing lip serves for example for sealing off with respect to dust and sound. Moreover, the second sealing lip contributes to realizing a situation in which, as far as possible, no water passes into the dry region.

According to at least one embodiment, a vehicle roof has a roof opening. The vehicle roof has a roof arrangement according to at least one of the embodiments described herein. The vehicle roof has the movable roof element for selectively closing off or at least partially opening up the roof opening. The frame which holds the movable roof element is coupled, for example screwed, to the vehicle roof. The first strand-like seal profile is fastened, for example by means of an adhesive connection, to the vehicle roof. The second strand-like seal profile is formed separately from the first seal profile. The vehicle roof consequently has two separate seal profiles, of which one is fixed to the vehicle roof itself and the other is fixed to the frame.

Further advantages, features and refinements emerge from the following examples explained in conjunction with the figures. Elements that are identical, of identical type and of identical action may be provided with the same reference signs in the figures.

DETAILED DESCRIPTION

Figure 1:
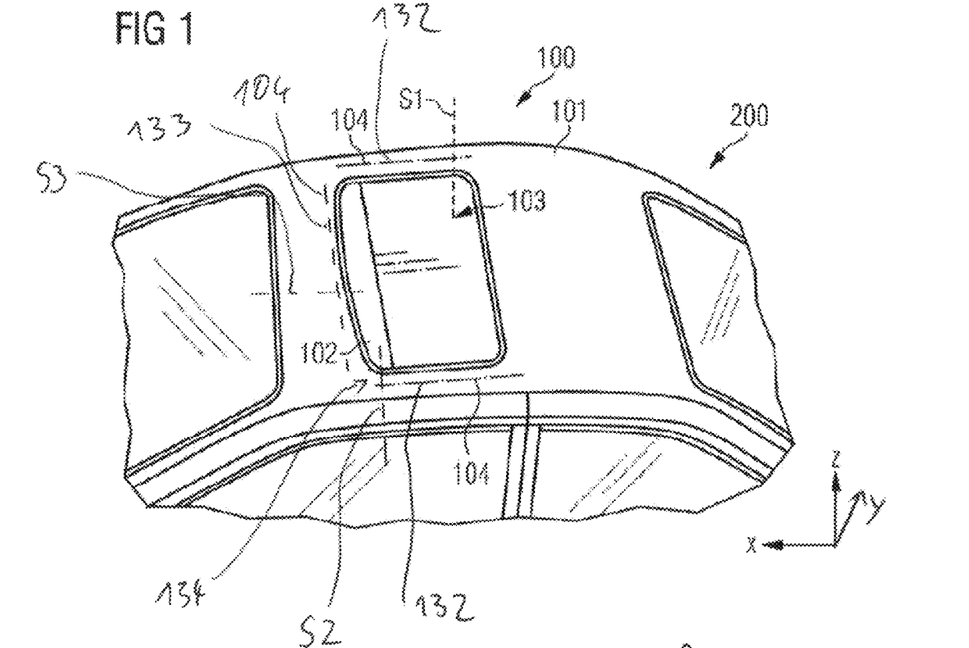
FIG. 1 shows a schematic illustration of a vehicle roof according to an exemplary embodiment, FIGS. 2 to 4 each show a schematic cross-sectional view of a roof arrangement according to an exemplary embodiment, FIGS. 5 and 6 each show a schematic cross-sectional view of a roof arrangement according to an exemplary embodiment.

FIG. 1 shows a vehicle roof 101 of a motor vehicle 200. The vehicle roof 101 is in particular the roof which is fixed to the vehicle, which is also referred to as roof panel. The vehicle roof 101 surrounds a roof opening 102. The roof opening 102 is selectively closed or at least partially openable by means of a movable roof element 103 which is displaceable along a direction X, also referred to as opening direction.

The movable roof element 103, also referred to as cover, is held by a frame 104. The frame 104 has for example guide rails which are fastened to the vehicle roof 101 along a longitudinal side 132 on either side of the roof opening 102. The roof has for example further elements which are arranged for example transversely to the X direction on a transverse side 133 along a Y direction. Along the transverse side 133, there are arranged on the frame 104 for example a motor and drive cable or other elements for displacement of the roof element 103.

The frame 104 serves in particular for guiding the movement of the roof element 103 and for holding the further elements, such as drive motors and/or cables. The roof element 103 and the frame 104 are in particular part of a roof arrangement 100 which can be used as a separate subassembly with the vehicle roof 101.

Figure 2:
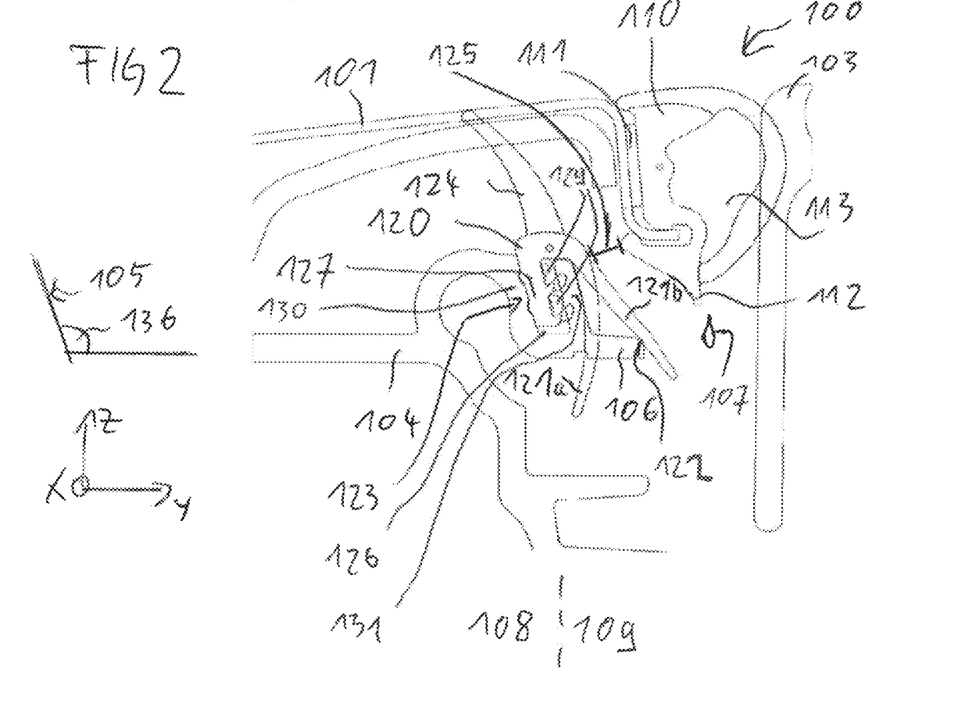

FIG. 2 shows a schematic sectional view along an exemplary section plane S1 (FIG. 1).

The roof arrangement 100 has in addition to the roof element 103 and to the frame 104 a first strand-like seal profile 110 and a second strand-like seal profile 120. The first seal profile 110 may be referred to as roof cutout seal. The second seal profile 120 may be referred to as secondary seal. The two seal profiles 110, 120 are of elastically flexible, resilient design. For example, at least the sealing sections of the seal profiles 110, 120 are in each case produced from foamed and/or soft rubber, rubber-type material or rubber-like material, while other sections of the seal profile are produced from harder material, in particular rubber-like material or rubber material. Exemplary materials are EPDM, cellular rubber, NBR or silicone rubber.

The first seal profile 110 serves for sealing off the movable roof element 103. The first seal profile is arranged horizontally between the vehicle roof 101 and the roof element 103. The second seal profile 120 is arranged along the vertical between the vehicle roof 101 and the frame 104.

When the vehicle roof 101 is closed, that is to say when the roof element 103 is arranged fully in the roof opening 102, the first seal profile 110 substantially seals off the transition between the vehicle roof 101 and the roof element 103. Nevertheless, water 107 can pass between the roof element 103 and the seal profile 110 in the direction of the vehicle interior counter to the Z direction. Said water is collected in a wet region 109 in a water-guiding channel of the frame 104 and, from there, is discharged in a controlled manner. It is thereby possible for passing of water 107 into a dry region 108 of the vehicle 200 to be prevented or at least substantially avoided.

The first seal profile 110 has a first seal tube 113. The first seal tube 113 is fastened to the vehicle roof 101 by means of an adhesive connection 111. A drip lip 112 is provided at the first seal tube 113. The drip lip 112 of the seal tube 113 points downwards, so that, during operation, water 107 passing between the first seal profile 110 and the roof element 103 in the direction of the vehicle interior drips off from the drip lip 112.

For example, when the motor vehicle 200 is inclined, it is possible for water 107 to drip off in the direction of the frame 104. In order to avoid said water 107 passing into the dry region 108, the second seal profile 120 is provided, said second seal profile being formed separately and apart from the first seal profile 110.

The second seal profile 120 has a projection 127. The projection 127 is configured to form a plug connection 123 to the frame 104. By means of the plug connection 123, the second seal profile 120 is fastened to the frame 104. The second seal profile 120 has a sealing lip 121. The sealing lip 121 extends, proceeding from the projection 127, in the direction of the frame 104 and in the direction of the roof element 103.

In FIG. 2, as well as in FIGS. 3 to 6, the sealing lip 121 is in each case illustrated in an original, non-mounted state. This state is indicated in the figure by the reference sign 121a. Moreover, the sealing lip 121 is illustrated in the orientation in which it is in the mounted state. This state is indicated in the figure by the reference sign 121b. The second seal profile 120 has in particular a single sealing lip 121, which has a common contact surface 122 with the frame 104 in the mounted state.

The sealing lip 121 is pressed against the frame 104, thus resulting in the formation of the common contact surface 122, at which no water can pass between the seal profile 120 and the frame 104. The contact surface 122 is formed on a free end, facing away from the projection 127, of the sealing lip 121.

The frame 104 has, for example, in particular along the longitudinal side 132, a rib 106 which has its main extent in the XY plane. Proceeding from that region of the second seal profile in which the plug connection 123 is formed, the sealing lip 121 extends in a downwardly inclined manner such that the sealing lip 121 is pressed against the rib 106 between the plug connection 123 and the roof element 103 along the Y direction and the contact surface 122 is formed.

On an upper side in the Z direction, the second seal profile 120 has a second sealing lip 124. The second sealing lip 124, in the operationally ready state, is pressed onto the vehicle roof 101 and provides sealing action mainly with respect to dust and sound, which consequently does not pass into the vehicle interior or passes into the latter only to a reduced extent.

The projection 127 of the second seal profile 120 is configured to be plugged into a plug-in region 126 of the frame 104 in order to fix the seal profile 120 to the frame 104 by means of the plug connection 123. The projection 127 has for example one or more clamping elements 129. The clamping elements 129 are each, for example, of flexible form such that, proceeding from a basic state, they can be deformed, and give rise to a holding force, when inserted into the plug-in region 126. The clamping elements 129, in the plug-in region 126, press from the inside against the side wall 130 and/or the side wall 131.

The plug-in region 126 is formed on the frame 104. The plug-in region 126 is delimited by a first side wall 130 and a second side wall 131. The two side walls 130, 131 are spaced apart from one another is such a way that the plugged-in projection 127 is clamped, and thereby held, between the two side walls 130, 131. The plugged-in projection 127 is in contact with the two side walls 130, 131.

The second seal profile 120 is thus connected to the frame 104 by means of the plug connection 123. For example, the second seal profile 120 is fixed by means of the plug connection 123 to a guide rail 104 on the longitudinal side 132. The plug connection 123 is formed in such a way that, for example, along the longitudinal side 132, the plug-in region 126 and the projection 127 have an inclination 105 in relation to the horizontal, in particular to the XY plane. The inclination 105 is formed in particular such that an angle 136 between the main orientation of the plug connection 123 and the horizontal is greater than 90°. Along the longitudinal side 132, the plug-in region 126 and the projection 127 are thus inclined away from the roof element 103 by way of the inclination 105.

The plug connection 123 of the second seal profile 120 allows expedient, quick and secure mounting. The inclination 105 allows a reduction in structural space along the Z direction. Consequently, a spacing 125 between the first seal profile 110 and the second seal profile 120 can be formed to be large enough for the plug connection 123, even with conventional tolerances, to be formed with an acceptable structural space requirement.

In the non-mounted state, the sealing lip 121 is configured so as to be situated vertically downwards, as represented in FIG. 2 by the reference sign 120a. During the mounting and the formation of the plug connection 123, upon contact with the frame 104, the sealing lip 121 is pressed laterally upwards, as represented in FIG. 2 by the reference sign 121b. This form and configuration of the sealing lip 121 allows reliable overlapping and support, in particular at the contact surface 122, with respect to the frame 104.

Figure 3:
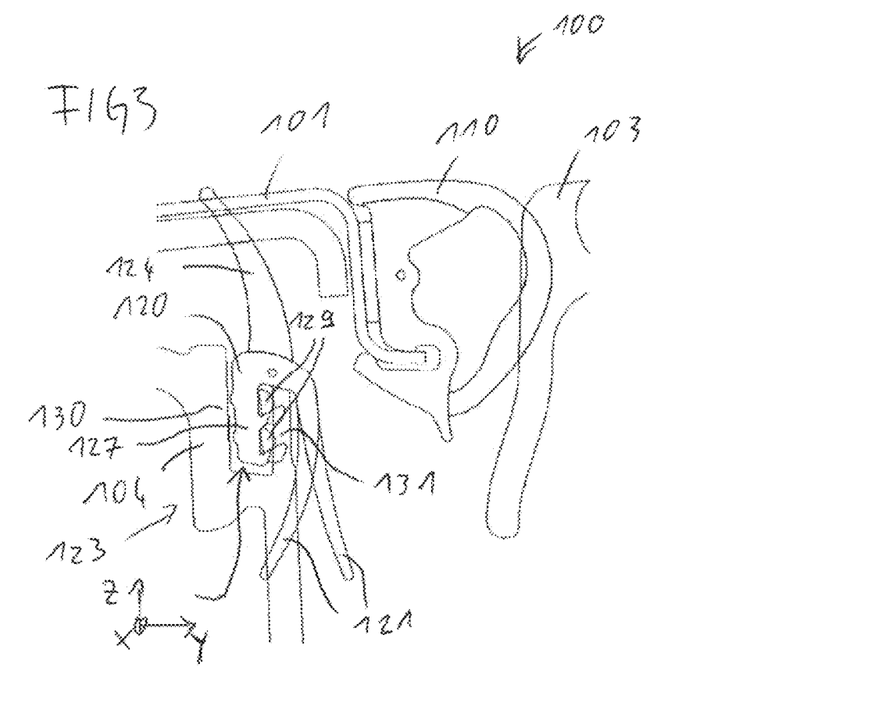

FIG. 3 shows a schematic sectional view along an exemplary section plane S2 (FIG. 1). For example, in this region, provision is no longer made of guide rails for holding displaceable drive parts such as a drive carriage. In this region, provision is made for example of a U-shaped front part of the frame 104 that extends mainly along the transverse side 133, merely a short section being routed on the longitudinal sides 132. In this region, the plug connection 123 is, for example, oriented along the Z direction and not inclined significantly to the vertical. In particular owing to the production of this front frame element 104 for example from plastic, an angled plug-in region 126 is not readily possible.

In a transition region 134 (FIG. 7) between the inclined plug-in region 126 and the vertical plug-in region 126, the projection 127 of the second seal profile 120 is rotated slightly in order to compensate for the differing orientation of the plug-in region 126. It is possible for the projection 127 to be provided with slits, for example, in the transition region 124, in order to make possible simple rotation of the projection 127. This is useful in particular in the case of large angle differences and large differences in the inclination 105 of the plug-in region 126.

Figure 4:
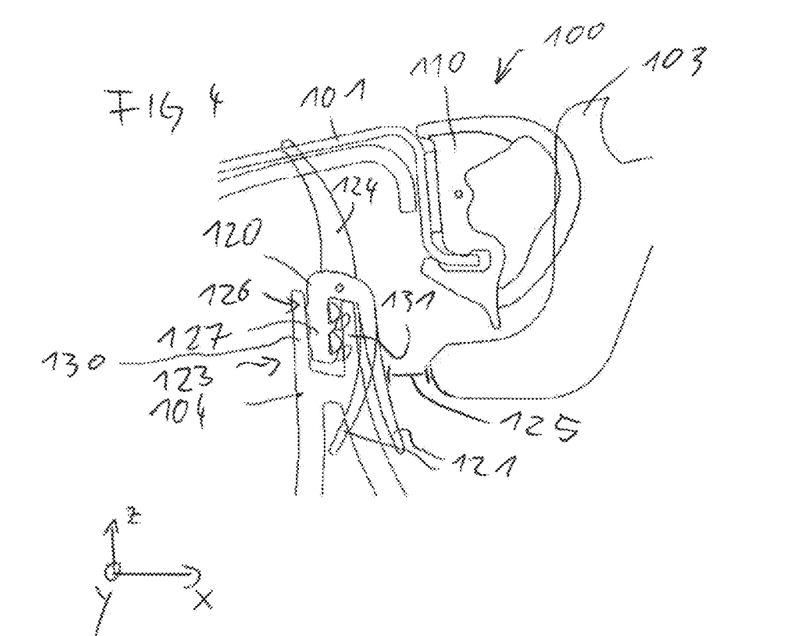

FIG. 4 shows a schematic sectional view along an exemplary section plane S3 (FIG. 1). In the front region along the transverse side 133, the plug-in region 126 is likewise formed along the Z direction without inclination to the vertical. The frame element in the illustrations in FIGS. 3 and 4 is in particular a common frame element, which is different from the frame element in FIG. 2. As illustrated in FIGS. 3 and 4, in these regions, the sealing lip 121 is arranged almost in its initial state. This prevents in particular a collision with adjacent components at constricted locations. As illustrated for example in FIG. 4, a collision between the roof element 103 and the sealing lip 121 can be avoided in particular with a cover lower handle of the roof element 103 below the vehicle roof 101 on the transverse side 133.

Figure 5:
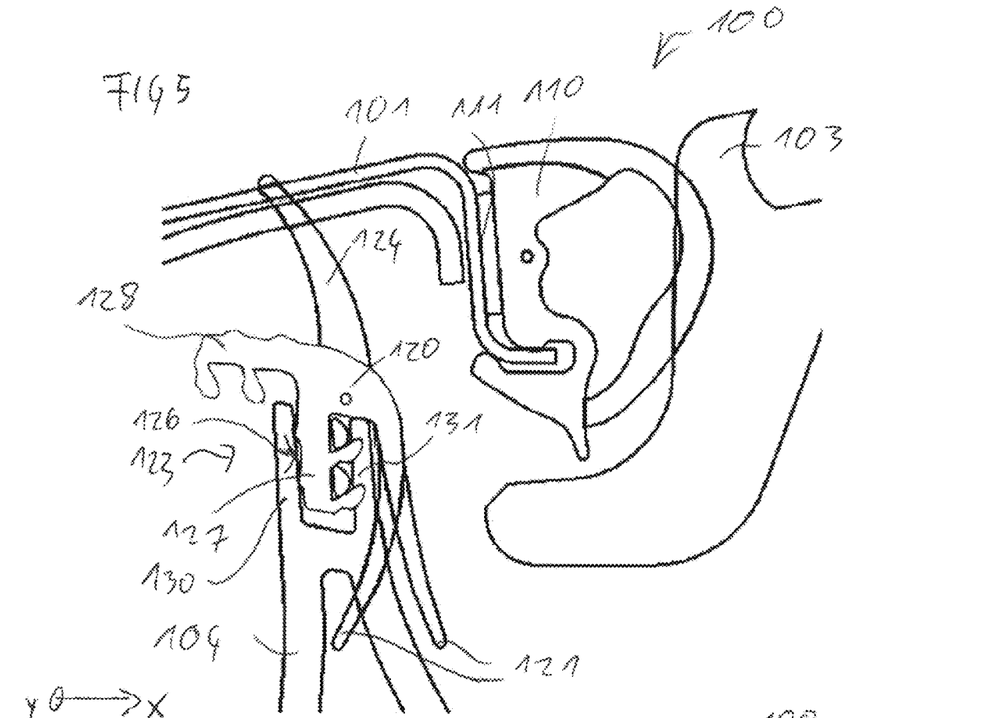
Figure 6:
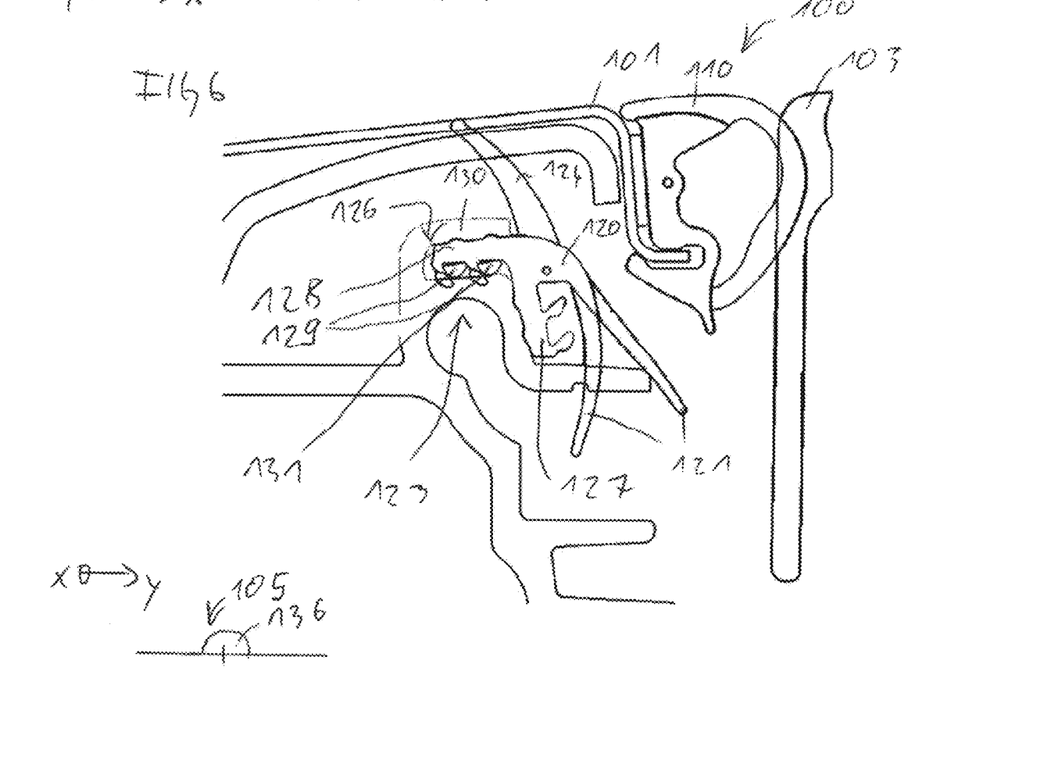

FIGS. 5 and 6 show the arrangement 100 with a second seal profile 120 according to a further exemplary embodiment. The remaining elements of the roof arrangement 100 are formed in particular in a manner corresponding to the exemplary embodiment as per FIGS. 2 to 4.

FIG. 5 shows a schematic sectional view along the exemplary section plane S3, and FIG. 6 shows a schematic sectional view along the exemplary section plane S1.

By contrast to the exemplary embodiment in FIGS. 2 to 4, the second seal profile 120 according to the exemplary embodiment in FIGS. 5 and 6 has a further projection 128 in addition to the projection 127. The two projections 127, 128 have mutually different orientations. The two projections 127, 128 form different mounting possibilities for the second seal profile 120. The further projection 128 is formed for example in a manner corresponding to the projection 127. The further projection 128 is configured to be plugged into the plug-in region 126 in order to form the plug connection 123. In particular, sectionally, only one of the two projections 127, 128 is ever in engagement in the plug-in region 126.

In the region of the longitudinal side 132, for example, the further projection 128 is plugged into the plug-in region 126. Consequently, a large inclination 105 of the plug-in region 126 to the vertical can be realized. The plug-in region 126 is oriented for example substantially horizontally. The angle 136 has for example a value in the neighbourhood of 180°, for example of between 160° and 200°. The further projection 128 allows the formation of the plug connection 123 even for a plug-in region 126 inclined greatly in this way without the second seal profile 120 having to be rotated too greatly in relation to the profile of the plug-in region 126 along the transverse side 133, where the plug-in region 126 is oriented substantially along the vertical.

Along the transverse side 133, the second seal profile 120 is fastened to the frame 104 by means of the projection 127. The projection 127 is arranged in the plug-in region 126. The further projection 128 is not arranged in the plug-in region 126. In the transition region 134, the switch between the projection 127 and the further projection 128 takes place, for example.

Along the longitudinal side 132, the further projection 128 is plugged into the substantially horizontal plug-in region 126 and the projection 127 is not plugged into the plug-in region 126. In the transition region, it is the case that, for example in a short section, neither the projection 127 nor the further projection 128 is plugged into the plug-in region 126. For example, in the transition region 134, an interruption 135 of the plug-in region 134 is provided (FIG. 7) in order to allow the rotation or the switch between the projections 127, 128. In the vertically extending plug-in region 126, it is then the case that the projection 127 is plugged in and the further projection 128 is not plugged into the plug-in region 126.

Figure 7:
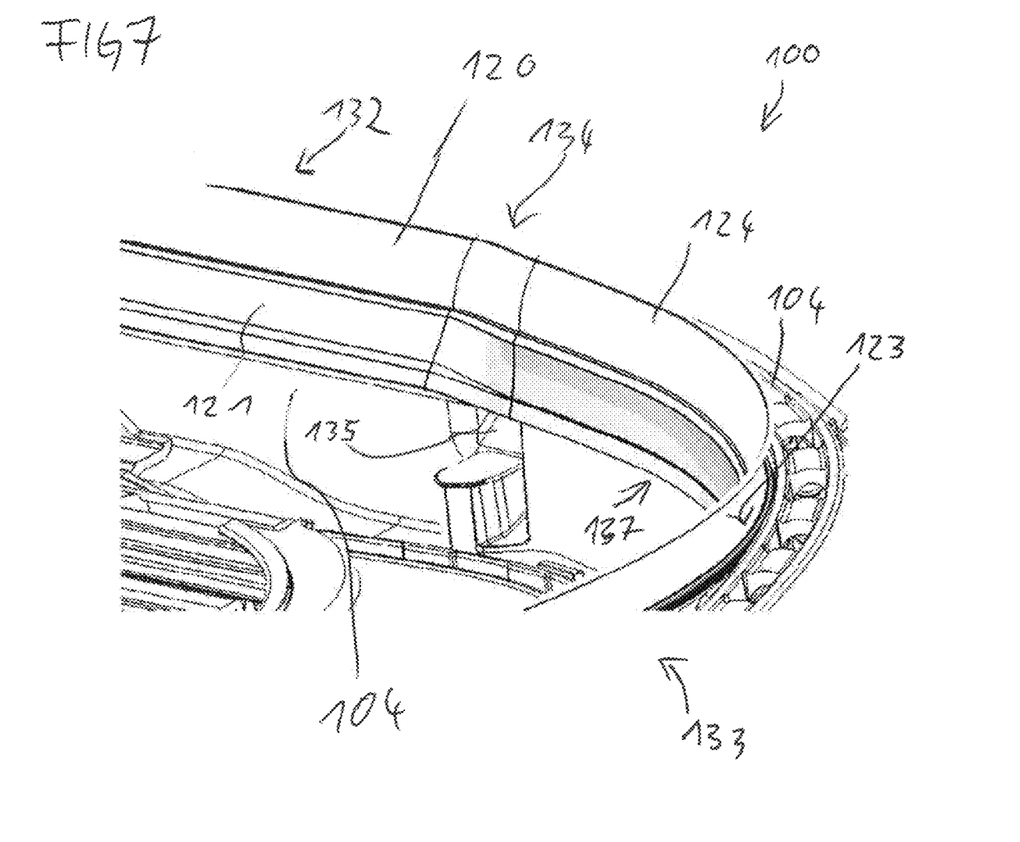
FIG. 7 shows a schematic perspective view of the roof arrangement according to an exemplary embodiment.

FIG. 7 shows a schematic perspective view of the arrangement 100. Along the longitudinal side 132, the second seal profile 120 is plugged into the inclined plug-in region 126. The sealing lip 121 is pressed against the frame 104 and thereby deflected (FIGS. 2 and 6). Consequently, along the longitudinal side 132, the sealing lip 121, which is vertical in the initial state, is constantly configured reliably with sufficient overlapping and support at the contact surface 122 with respect to the frame 104, in particular the rib 106 of the guide rail. The sealing lip 121 can also be pressed against the frame 104 with a relatively high counterpressure since the plug connection 123 is not adversely influenced by the high counterpressure. Unlike for example an adhesive connection, the plug connection 123 is not adversely influenced by the counterpressure. It is rather the case that the counterpressure results for example in greater wedging of the projection 127 or of the further projection 128 in the plug-in region 126 and consequently to a reliable plug connection 123.

The interruption 135 is provided in the transition region 134 between the longitudinal side 132 and the transverse side 133. The interruption 135 interrupts for example the plug-in region 126. Consequently, for example, the rotation of the projection 127 according to the exemplary embodiment in FIGS. 2 to 4 is possible. Alternatively, the switch between the projection 127 and the further projection 128 according to the exemplary embodiment in FIGS. 5 and 6 in the transition region 134 at the interruption 135 is possible.

Owing to the vertical orientation, corresponding substantially to the initial state, of the sealing lip 121 in a curve 137 between the longitudinal side 132 and the transverse side 133 and also along the transverse side 133, the sealing lip 121 can be arranged without undulation. The sealing lip 121 can be realized without undulation in the curve 137 and also along the transverse side 133. Undulation of the sealing lip 121 can occur if, in the curve 137 too, the sealing lip 121 were arranged with relatively high counterpressure and relatively large deflection from the initial state. This can be avoided with the roof arrangement 100 owing to the fastening of the second seal profile 120 by means of the plug connection 123. The non-undulating formation of the sealing lip 121 in the mounted state is both aesthetically more appealing and useful for reliable sealing.

Figure 8:
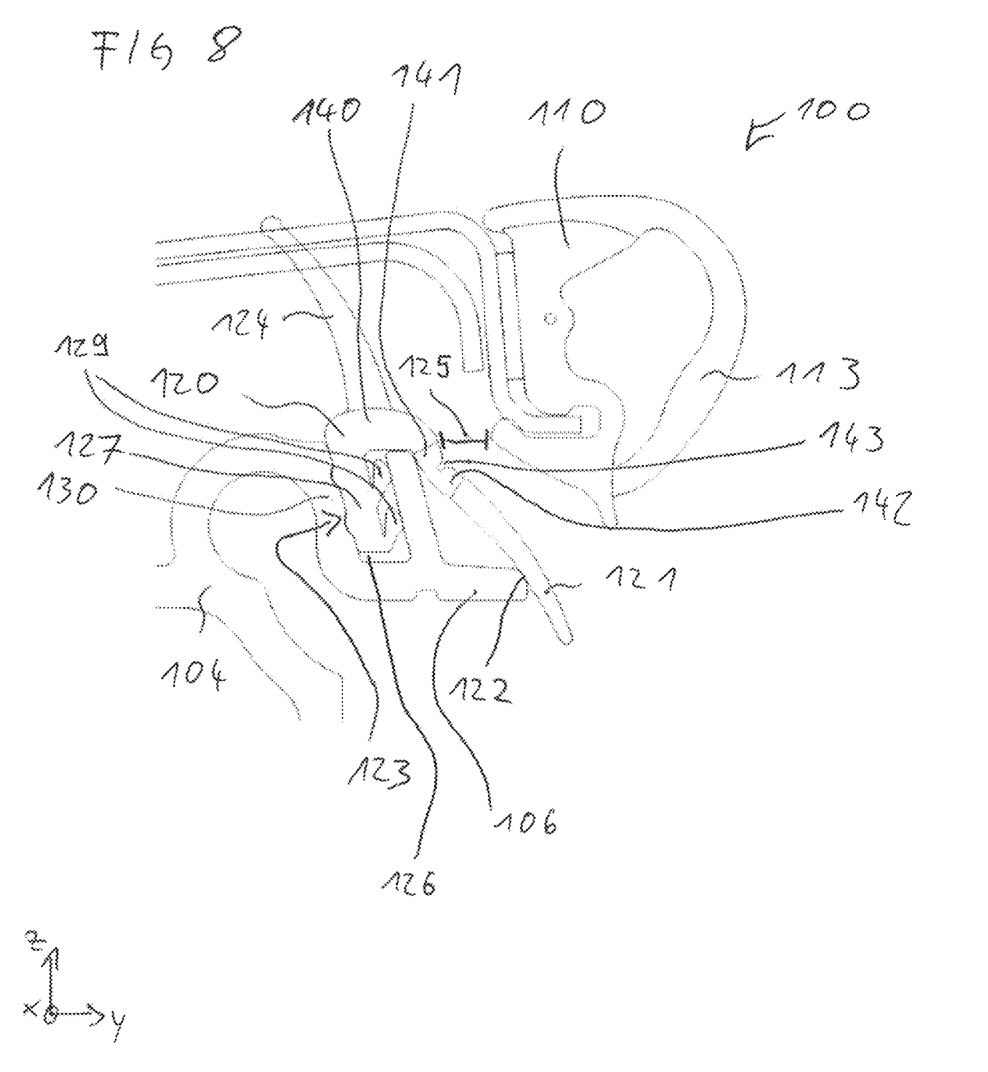
FIG. 8 shows a schematic cross-sectional view of a roof arrangement according to an exemplary embodiment.

FIG. 8 shows a schematic sectional view along an exemplary section plane S1 (FIG. 1) according to a further exemplary embodiment. The exemplary embodiment as per FIG. 8 corresponds substantially to the exemplary embodiment as described in connection with FIGS. 2 to 4. By contrast to this, the second strand-like seal profile 120 according to the exemplary embodiment in FIG. 8 has a sub-region 141 composed of a relatively soft material. Alternatively or additionally, the sealing lip 121 according to the exemplary embodiment in FIG. 8 has a notch 143.

The notch 143 is formed for example in the sub-region 141. According to further exemplary embodiments, the notch 143 is formed outside the sub-region 141. The notch 143 may also be provided without the sub-region 141. The sub-region 141 may also be provided without the notch 143. According to exemplary embodiments, the notch 143 is arranged on a side of the sealing lip 121 that faces away from the frame 104 and that faces towards the first seal profile 110, as illustrated in FIG. 8. According to further exemplary embodiments, the notch 143 is alternatively or additionally arranged on a side of the sealing lip 121 that faces towards the frame 104 and that faces away from the first seal profile 110, as illustrated in FIG. 8. According to exemplary embodiments, provision is made of only a single notch 143. According to further exemplary embodiments, provision is made of multiple notches 143, for example two or three notches 143.

The second seal profile 120 has a base 140. The plug connection 123 is formed on the base 140. The projection 127 is formed on the base 140. The sub-region 141 is formed between the base 140 and the sealing lip 121, in particular between the base 140 and the contact surface 122 of the sealing lip 121. The sub-region 141 is produced from a softer material than the base 140. The sub-region 141 is produced from a softer material than the sealing lip 121 in the region of the contact surface 122. For example, the sub-region 141 is composed of a cellular rubber 142 or comprises cellular rubber 142, for example foamed EPDM. For example, the sub-region has a hardness of approximately 40 Shore A.

For example, the base 140 and the sealing lip 121 outside the sub-region 141 in each case are composed of solid rubber or comprise solid rubber. The solid rubber is for example an unfoamed solid-rubber material. For example, the solid rubber has a hardness of approximately 80 Shore A. For example, the second seal profile 120 is produced by means of two-component injection moulding. Three-component injection moulding is also possible, so that the second seal profile has three different regions with for example in each case mutually different hardnesses.

The sub-region 141 makes it possible for the sealing lip 121 to be angled relative to the base 140 in the manner of a hinge. Consequently, it is also possible, with sufficiently large preloading and stiffness of the sealing lip 121, for the contact surface to be reliably formed. The preloading is predefined for example according to the production process and/or an installation radius for example in the curve 137. The sub-region 141, despite the preloading, avoids undesired upward bending of the sealing lip 121. Consequently, a sufficient spacing to the first seal profile 110 can be reliably maintained. The sub-region 141 locally reduces the preloading in order to realize reliable abutment of the sealing lip 121 against the rib 106.

The notch 143 makes it possible for the sealing lip 121 to be angled relative to the base 140 in the manner of a hinge. Consequently, it is also possible, with sufficiently large preloading and stiffness of the sealing lip 121, for the contact surface to be reliably formed. The preloading is predefined for example according to the production process and/or an installation radius for example in the curve 137. The notch 143, despite the preloading, avoids undesired upward bending of the sealing lip 121. Consequently, a sufficient spacing to the first seal profile 110 can be reliably maintained. The notch 143 locally reduces the preloading in order to realize reliable abutment of the sealing lip 121 against the rib 106.

In particular a combination of the sub-region 141, for example composed of cellular rubber 142, and the notch 143 particularly usefully makes it possible for the sealing lip 121 to be angled relative to the base 140 in the manner of a hinge. The sub-region 141 and the notch 143 locally reduce, for example jointly, the preloading in order to realize reliable abutment of the sealing lip 121 against the rib 106 and to avoid undesired upward bending of the sealing lip 121.

According to exemplary embodiments, the notch 143 is arranged in the sub-region 141 on the inner side. Good folding behaviour of the sealing lip 121 in the curve 137 can thus be realized. The inner side faces towards the frame 104. It is thus possible for example for undulation of the sealing lip 121 in the radius profile of the curve 137 to be reliably reduced.

According to further exemplary embodiments, the sub-region 141 and/or the notch 143 may also be combined with the configurations of the second seal profile 120 as per FIGS. 5 and 6. Accordingly, the second seal profile 120 has for example the two projections 127, 128 and also the sub-region 141 composed of the softer material, in particular composed of the cellular rubber 142. As an alternative to the sub-region 141 composed of the softer material, or in addition to the sub-region 141, the second seal profile 120 with the two projections 127, 128 has the notch 143. The notch is formed for example in the sub-region 141.

The roof arrangement 100 with the plugged-in seal profile 120 makes possible both simple mounting and reliable operation. In the region of the longitudinal side 132, a relatively high counterpressure and reliable sealing can be realized. In the region of the curve 137 and of the transverse side 133, a vertical orientation of the sealing lip 121 without relatively large preloading is possible.

The invention claimed is:

1. A roof arrangement for a vehicle roof with a roof opening, having:
   a movable roof element for selectively closing off and at least partially opening up the roof opening, wherein the roof element is held by a frame,
   a first strand-like seal profile
   a second strand-like seal profile, which is formed separately from the first seal profile, wherein
   the first seal profile is configured for sealing with respect to the movable roof element and fastenable to the vehicle roof,
   the second seal profile is fastened to the frame by a plug connection and is configured for sealing between the frame and the vehicle roof, wherein the plug connection has a plug-in region of the frame, into which plug-in region a projection of the second seal profile is plugged,
   the plug-in region, at least sectionally, is formed so as to be inclined in relation to a vertical direction, and
   in which the plug-in region is formed so as to be predefinably inclined to a greater extent on a longitudinal point of the frame, which extends along an opening direction of the roof element, than on a transverse point of the frame, which extends transversely to the opening direction.

2. The roof arrangement according to claim 1, in which the plug-in region has two mutually oppositely situated side walls and the projection is plugged in between the two side walls.

3. The roof arrangement according to claim 1, in which an interruption of the plug-in region is provided in a transition region between the longitudinal side and the transverse side.

4. The roof arrangement according to claim 1, in which the second seal profile has a further projection, by way of which the plug connection is formed.

5. The roof arrangement according to claim 1, in which the second seal profile has a sealing lip which abuts against the frame.

6. The roof arrangement according to claim 5, in which a notch is provided on the sealing lip to locally weaken the sealing lip.

7. The roof arrangement according to claim 5, in which the sealing lip has a sub-region composed of a material, wherein the material of the sub-region is softer than another material of the sealing lip outside the sub-region.

8. The roof arrangement according to claim 1, in which the first seal profile fastenable to the vehicle roof by-an adhesive connection.

9. The roof arrangement according to claim 1, in which the second seal profile has a second sealing lip for sealing with respect to the vehicle roof.

10. A vehicle roof with a roof opening, having:
    a roof arrangement according to claim 1,
    wherein
    the frame which holds the movable roof element is coupled to the vehicle roof, and
    the first strand-like seal profile is fastened to the vehicle roof.

* * * * *

UNITED STATES PATENT AND TRADEMARK OFFICE
CERTIFICATE OF CORRECTION

PATENT NO. : 11,958,343 B2
APPLICATION NO. : 17/740523
DATED : April 16, 2024
INVENTOR(S) : Samuel Schuster It is certified that error appears in the above-identified patent and that said Letters Patent is hereby corrected as shown below:

On the Title Page

(30) Foreign Application Priority Data: insert -- May 20, 2021 DE 102021113141 3 --.

Signed and Sealed this
Twenty-third Day of July, 2024

Katherine Kelly Vidal
*Director of the United States Patent and Trademark Office*